United States Patent
Newberry

(10) Patent No.: US 7,103,429 B2
(45) Date of Patent: Sep. 5, 2006

(54) UNIVERSAL COMPUTER ARCHITECTURE

(75) Inventor: Robert Newberry, Filderstadt-Plattenhardt (DE)

(73) Assignee: DaimlerChrysler AG, Stuttgart (DE)

( * ) Notice: Subject to any disclaimer, the term of this patent is extended or adjusted under 35 U.S.C. 154(b) by 257 days.

(21) Appl. No.: 10/476,214

(22) PCT Filed: Jun. 7, 2002

(86) PCT No.: PCT/EP02/06251

§ 371 (c)(1),
(2), (4) Date: Jun. 2, 2004

(87) PCT Pub. No.: WO03/014959

PCT Pub. Date: Feb. 20, 2003

(65) Prior Publication Data

US 2004/0225415 A1    Nov. 11, 2004

(30) Foreign Application Priority Data

Aug. 11, 2001 (DE) .................. 101 39 610

(51) Int. Cl.
    *G05B 19/42*     (2006.01)
    *G06F 9/00*      (2006.01)
    *G06F 1/24*      (2006.01)
    *G06F 7/00*      (2006.01)
    *G05D 1/00*      (2006.01)
    *G05D 3/00*      (2006.01)

(52) U.S. Cl. .................. 700/86; 701/1; 701/36; 713/100; 700/87; 700/89

(58) Field of Classification Search .......... 700/86–87, 700/89; 701/1, 36; 712/15; 710/8, 10, 65; 713/100; 326/37–39

See application file for complete search history.

(56) References Cited

U.S. PATENT DOCUMENTS

| | | | |
|---|---|---|---|
| 5,457,410 A | 10/1995 | Ting | 326/41 |
| 5,737,711 A * | 4/1998 | Abe | 701/29 |
| 5,748,888 A | 5/1998 | Angelo et al. | |
| 5,794,164 A * | 8/1998 | Beckert et al. | 455/3.06 |
| 5,982,368 A * | 11/1999 | Toffolo et al. | 715/835 |
| 6,014,509 A | 1/2000 | Furtek et al. | 395/500.17 |

(Continued)

FOREIGN PATENT DOCUMENTS

DE      19614991      10/1996

(Continued)

OTHER PUBLICATIONS

Reconfigurable Vehicles; Karen Parnell, Xilinx; Nov. 9, 2001, pp. 1-16.*

*Primary Examiner*—Anthony Knight
*Assistant Examiner*—Ronald D. Hartman, Jr.
(74) *Attorney, Agent, or Firm*—Crowell & Moring LLP

(57) ABSTRACT

A universal computer for a vehicle, comprising a microprocessor for the processing of control programs, a storage unit, for the data thus calculated and an interface which permits a connection of the computer to a databus in the vehicle. The computer comprises control programs for controlling device provided in the vehicle, whereby the control commands are transmitted to the device to be controlled via device interfaces. The computer also comprises reconfigurable hardware, which permits a retroactive reconfiguration of peripheral components or an interface in the assembled state of the computer. A transmission of an algorithm for reconfiguration of the hardware is provided to the storage unit on the vehicle, so that a process for reconfiguration of the hardware associated with the peripheral components or the interface may be carried out.

10 Claims, 1 Drawing Sheet

U.S. PATENT DOCUMENTS

| | | | |
|---|---|---|---|
| 6,175,789 B1* | 1/2001 | Beckert et al. | 701/33 |
| 6,270,350 B1* | 8/2001 | Christopher | 434/69 |
| 6,477,611 B1* | 11/2002 | Chang | 710/313 |
| 6,526,340 B1* | 2/2003 | Reul et al. | 701/29 |
| 6,662,087 B1* | 12/2003 | Liebl et al. | 701/29 |
| 6,728,603 B1* | 4/2004 | Pruzan et al. | 701/1 |
| 6,996,443 B1* | 2/2006 | Marshall et al. | 700/87 |
| 2004/0186938 A1* | 9/2004 | Imada et al. | 710/100 |
| 2005/0125117 A1* | 6/2005 | Breed | 701/29 |
| 2005/0154475 A1* | 7/2005 | Forchert et al. | 700/20 |

FOREIGN PATENT DOCUMENTS

| | | |
|---|---|---|
| DE | 19843640 | 3/2000 |
| DE | 19961589 | 7/2001 |
| DE | 19963208 | 7/2001 |
| EP | 0945788 | 9/1999 |

* cited by examiner

UNIVERSAL COMPUTER ARCHITECTURE

BACKGROUND AND SUMMARY OF THE INVENTION

This application claims the priority of German patent document 101 39 610.4, filed 11 Aug. 2001 (PCT International Application No. PCT/EP02/06251), filed Jun. 7, 2002 the disclosure of which is expressly incorporated by reference herein.

The invention relates to a universal computer for vehicle, having a microprocessor for processing control programs, a storage means for the data which is calculated in the process, and an interface which permits the computer to be connected to a vehicle data bus. The computer has control programs for controlling vehicle devices and device interfaces that transmit control instructions to the devices that are to be controlled.

German patent document DE 197 48 536 C2 discloses a computer for a vehicle, which is provided with a microprocessor, various storage means and an interface which permits connection to a CAN bus. Such control devices ordinarily also have interfaces via which various devices, such as a mobile telephone or a navigation device, can be coupled.

A disadvantage of the conventional control devices is that the computers remain installed in the vehicle during its entire service life, so that the hardware of the computers is predefined. Subsequent exchange of the hardware in a vehicle which is in use cannot be carried out in contemporary network systems (with up to 60 computers in a vehicle), due to the high degree of expenditure on configuration. As a result, hitherto all that has been considered is to exchange various software modules during the service life of the vehicle so that the software is adapted to changing in conditions.

It is then necessary also to configure parts of the hardware in a way which can be flexibly adapted. In particular in the telecommunications market (for example in the case of mobile telephones), the design of the housings and interfaces are changed frequently. Thus, it is virtually impossible to subsequently connect a relatively modern mobile telephone to a control device in the vehicle.

German patent document DE 197 50 662 A1 discloses a processor unit for a data processing protected electronic control system in a motor vehicle, in which the computer is a scaleable arithmetic unit (i.e., a piece of hardware which is designed to meet the power requirements with different processor power); and depending on the demands, it can be replaced with a faster or slower microprocessor. If a relatively high processor power is called for, the microprocessor can then be replaced by a more powerful one, it being possible to plug the scaleable processor into the same processor connector. However, the hardware is replaced in its entirety, which is possible if the control devices are opened, the hardware exchanged and the software programs correspondingly input.

Reconfigurable hardware in the form of field programmable gate arrays (FPGA) are disclosed, for example, in U.S. Pat. Nos. 5,457,410 and 6,014,509, and in International Patent Document WO 95/28769. These FPGAs have memory cells such as flip flops which can also change their function after manufacture. The memory cells are freely configurable with one another, electrically conductive connections being newly wired so that diverse logical circuits can be established. By means of such FPGAs it is possible to simulate logic circuits and in particular to construct electrical filters, or they can be used simply as storage means.

An article in Elektronik [Electronics] July 1998, page 38, entitled "Mit programmierbarer Logik verheiratet [Wedded to programmable logic]" discloses that an FPGA field is provided as reprogrammable hardware in order to perform complex computing tasks.

European Patent Document EP 801 351 A2 discloses a microprocessor with interface modules which have FPGAs. The use of FPGAs makes it possible to reconfigure these interface modules to adapt to different components.

One object of the present invention is to provide a universal computer for a vehicle, which is suitable for use with a data bus and other control devices, can be adjusted within the vehicle without changing the hardware, to new interface requirements or subsequently interchangeable devices, and at the same time provides a specific storage region of the algorithm for configuring the hardware.

This and other objects and advantages are achieved by the computer according to the invention, which has transmission means that transmit an algorithm for reconfiguring the hardware to the storage means in the vehicle so that the hardware which relates to the peripheral components or the interface can be reconfigured. A storage control means is provided which automatically transmits the algorithm for reconfiguring the hardware to the storage means in the vehicle, and a memory is provided in which a plurality of data pages for configuring the hardware are stored. Only one of these data pages is classified as valid as in the present device configuration, and the storage control means retrieves the applicable data pages in accordance with the configuration.

According to the present invention, the computer is installed in the vehicle in the form of a control device when the vehicle is manufactured. Together with other control devices, it forms a network within the vehicle. The various control devices can communicate with one another via the data bus, and control programs are provided for actuating, via device interfaces, devices which can be coupled to the network.

According to the invention reconfigurable hardware is used, which can be reconfigured by downloading an algorithm, even years after the vehicle has been delivered to the customer. The algorithm may be a hardware description language which describes the configuration of the respective hardware. Such reconfigurable hardware is used in particular in all interfaces and peripheral components which are frequently affected by hardware changes. "Peripheral components" is understood to mean interrupt controllers, logic modules and circuits as well as filters and output stage actuation circuits, which control devices which are connected. In addition, these include interface drivers, addressing components, devices for actuating data buses or logic units for controlling storage. The microcomputer itself can also be simulated by an FPGA module.

For example, a central vehicle display is arranged in the interior of the vehicle and can be actuated by means of a control device. Various telematics devices (for example a mobile telephone, a navigation system or various audio or video devices) are connected to the vehicle network via a device interface. If an additional device is then connected to the network or a control device or a relatively old device is replaced with a device according to a new standard, on the one hand the necessary driver software is transmitted from the outside to a storage means in the computer using a transmission means. However, on the other hand, the wiring between the device interface and the computer can also be changed by the reconfigurable hardware using an algorithm for reconfiguring the hardware so that it is unnecessary to exchange the entire device interface, as is customary, but rather the hardware can be reconfigured. Furthermore, various digital filters and logic circuits can be reconfigured or newly connected by virtue of the fact that an algorithm for reconfiguring a service center is transmitted to the storage means of the computer.

In this way, a plurality of configuration algorithms for the FPGA can be stored in a storage area of the computer, and the FPGA module is configured by the storage control means by means of a memory access. The storage control means can then access the currently applicable data page at the same memory address, and configures the FPGA hardware correspondingly. In a memory addressing area in the memory, the currently applicable data page is respectively superimposed on the other pages which could be used as an alternative for configuring the hardware, but are not currently required owing to the existing device circuitry.

The advantage of this new universal computer architecture is that specific hardware elements can be reconfigured so that standard logic elements and their wiring can be changed or subsequently rewired. In this way, in future, hardware will no longer need to be exchanged if new devices are retrofitted in the vehicle; rather the hardware can be correspondingly adapted by means of an algorithm for reconfiguring the hardware. In this way, it is not necessary to provide new hardware whenever a device is changed, because it can be adapted by means of the reconfigurable hardware when new devices are used. On the other hand, it is also possible to adapt the long-life computer architecture which is present in the vehicle to new conditions by reconfiguring its functionality.

The reconfigurable hardware preferably has freely connectable memory cells with reconfigurable electrical connections which can be subsequently newly connected in accordance with the algorithm for reconfiguring the hardware in the installed state of the vehicle. The reconfigurable hardware may be a FPGA that is either ROM-based (in which case information is retained when the power fails and the hardware can be changed by means of ultraviolet light or electronic processes) or RAM-based (whose information is lost when the power fails). Such FPGAs can be appropriately reprogrammed by means of an algorithm, for example a set of instructions for programming digital logic functions. FPGAs can also be used as state machines. Here, the signals assume various, permanently predefined states such as are also implemented today in means of transportation in the form of state machines.

In one preferred embodiment of the invention, the microprocessor of the computer has standard cell blocks (SCB), and is constructed from various predefined logic blocks, so that logic components from various electronic manufacturers can be combined in one microprocessor and implemented in the form of what is referred to as a user specific module (ASIC). The invention then combines advantages of a standard cell block microprocessor core with reprogrammable hardware, and it is possible to transmit the software and algorithms for reconfiguring the hardware to a storage means of the computer over a wire-free interface. Using the information which is transmitted from a service center over the wire-free interface, it is then possible to reconfigure the universal computer in terms of hardware in accordance with the algorithms and thus adapt it to new external devices or further hardware requirements.

In another embodiment of the invention, a storage control means is provided which, without affecting the processor time of the microprocessor, transmits the algorithm for reconfiguring the hardware to the storage means in the means of transportation automatically. If necessary, when triggered by a service center or the microprocessor, the storage control means can request transmission of the algorithms for the reconfiguration of the hardware and then store the result data in what is referred to as a flash memory, for example. The wire-free interface via which the data can be transmitted to the computer may be implemented, for example, in a GSM Standard or according to the Bluetooth Standard. The storage control means according to the present invention thus relieves the loading on the computer which is occupied with control programs when it is operating, and transmits the algorithms for reconfiguring the hardware into a flash memory independently of the microprocessor. A flash memory is suitable for long-term storage of data which can be transmitted from a service center to the means of transportation. By transmitting the reconfiguration algorithms over a wireless interface and reading in the data as well as algorithms into the flash memory, a highly flexible and effective computer architecture is produced which permits later reconfiguration of the hardware.

As the microcomputer is preferably composed of standard cell blocks, the hardware structures can be modularized and also easily transferred to reconfigurable hardware (FPGA). Such standard cell blocks are then eliminated from the microcomputer hardware and programmed in the form of FPGAs by means of the reconfiguring algorithms. The standard cell blocks can, however, also be provided within the microprocessor which can then be wired in a variable fashion to a device interface via the reconfigurable hardware. On the other hand, the reconfigurable hardware can also be arranged as a peripheral device next to the microprocessor and can carry out the wiring and the processing of the electrical signals.

The storage control means can be responsible not only for the control of data transmission but also for data protection. All the data which is transmitted to the computer via the interfaces (for example the device interfaces or the interface for transmitting the algorithm for reconfiguration) can, for this purpose, run via the storage control means. The storage control means then checks a specific enabling number or private and public keys according to an encryption method, and the data (i.e., the algorithm for reconfiguring the hardware) cannot be transmitted to the computer until there is a positive check. If an algorithm is to be transmitted from an external service center or from a device which is coupled to the device interface to the computer, first a request for the transmission of the reconfiguration data may be necessary.

In addition, after the microprocessor has been powered up, an enable signal to the storage control means may be necessary in order to signal that the system is ready for an external data transmission, and the storage control means can independently carry out the transmission of an algorithm to the flash memory or to an overlay memory. It is possible to provide a state in which an external transmission of hardware algorithms is completely prohibited.

If, for example, hardware configuration data are stored in a specific memory area of a memory, it is possible to provide that all such data can be retrieved at the same address, with only one of the memory pages (representing the present hardware configuration for a device which is connected) being active. The other data pages may provide algorithms in the form of a hardware configuration language if another device is to be connected. Then, only one of the previously inactive memory pages is activated, as a result of which the hardware configuration for the new device is automatically set. The reconfigurable module is automatically rewired by the hardware description language with respect to the connections between the individual memory cells, and wired differently with respect to the memory cells. As a result, for example, the interface is configured with a new pin to pin connection.

Other objects, advantages and novel features of the present invention will become apparent from the following detailed description of the invention when considered in conjunction with the accompanying drawings.

BRIEF DESCRIPTION OF THE DRAWINGS

The single FIGURE is a diagram showing a schematic view of various functional blocks according to an embodiment of the universal computer according to the present invention.

DETAILED DESCRIPTION OF THE DRAWINGS

Figure 1:
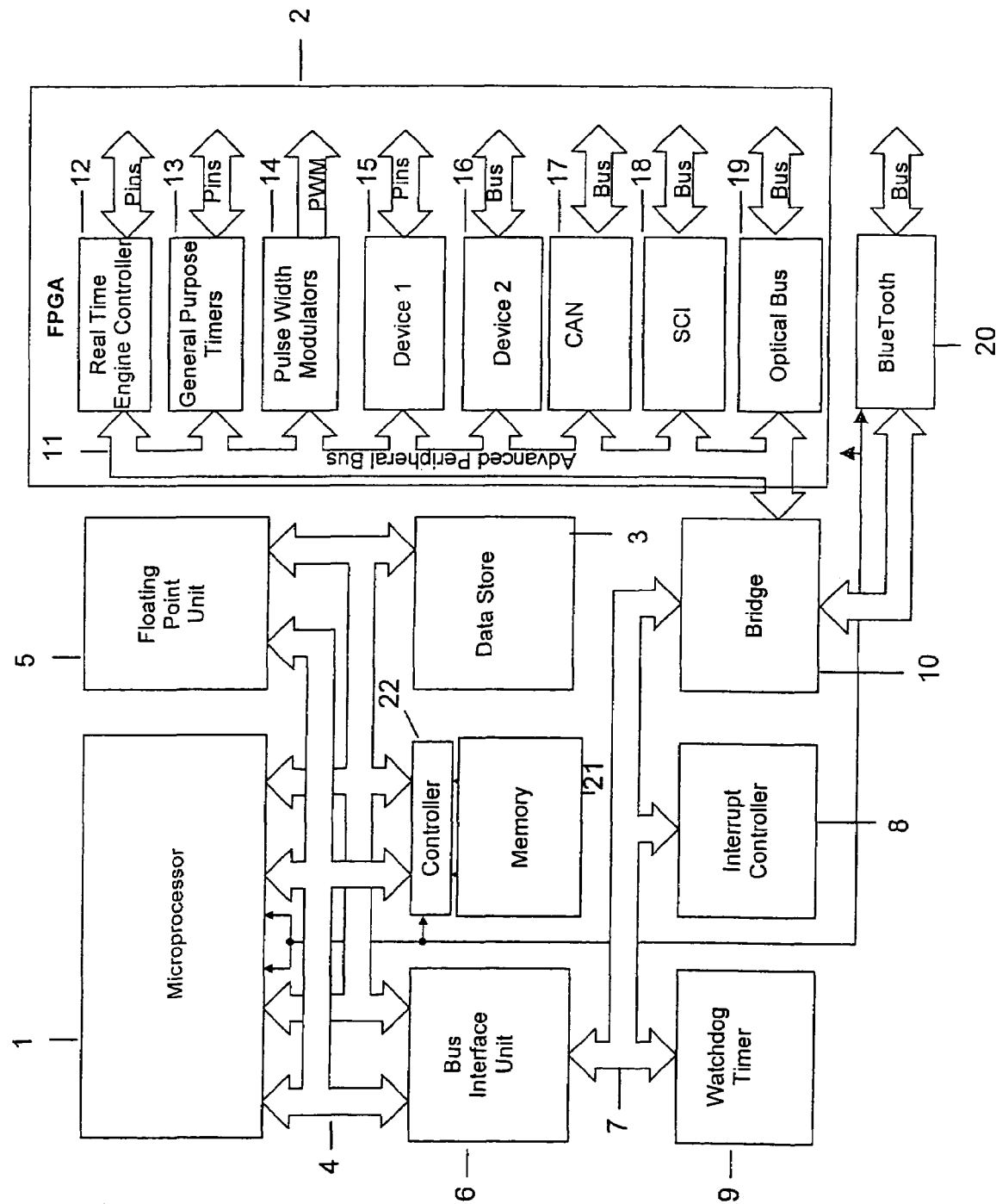

The universal computer according to the present invention has a microprocessor 1, an FPGA module 2 as reconfigurable hardware and a storage device 3 in which the data calculated or read in can be stored via the data storage path 4. In addition, a floating point unit 5, for calculating sliding decimals, and a bus interface unit 6, which can transmit the data within the computer via the internal bus or can control the transmission of data, are provided. In order to control the peripheral devices and evaluate specific signals, an interrupt controller 8 provided on the internal data bus 7 controls programs with the support of a watchdog unit 9 and a timer.

The internal data bus 7 is connected via what is referred to as a bridge 10 to the internal data bus 11 in order to actuate the peripheral components and various interfaces 15–19, including a real-time control device 12, a further timer 13 for variable use, a pulse-width modulator 14 and a plurality of device interfaces 15, 16 as well as a plurality of data bus interfaces 17–19. One of the data bus interfaces 17 is a CAN bus interface, a further interface 19 being suitable for connecting an optical data bus. A wireless interface 20 is provided, in particular according to the Bluetooth Standard, in order to store software, data and algorithms for reconfiguring the hardware in a wireless fashion on a flash memory 21. In particular a hardware description language, for example according to the Verilog Standard, is used as the algorithm for reconfiguring the hardware.

A storage control means 22 is provided for automatically transmitting the reconfiguration algorithm, the data or software to the flash memory 21 in the means of transportation. The storage control means 22 can carry out the transmission of data via the Bluetooth interface 20 independently of the microprocessor 1, so that the microprocessor 1 can use its computing time for the control processes from outside to the devices connected to the interfaces 15–19. The flash memory 21 is provided for loading a special software item that permits, on the one hand, the reprogramming algorithm of the FPGA and on the other hand the initialization of the FPGA module 2 at the beginning during normal operation. In addition, the storage control means 22 can transmit data-synchronously or asynchronously with respect to a computing process into the microprocessor 2 from the storage means 3.

The storage control means 22 provides a flash memory reprogramming mode in which an authorization check for the transmission of data is first carried out, and, when authorization is given it provides for algorithms, data or software to be transmitted into the flash memory 21. The storage control means 22 also provides an FPGA reconfiguration mode, in which a first authorization check of the system user is also carried out and a reconfiguration algorithm is then loaded. An algorithm may be written, for example, in the hardware description language (HDL) there being a description there of the way in which the hardware is reconfigured.

The storage control means 22 can also actuate specific memories which stores algorithms and data on data pages, which are assigned a selection value. At each access time, only that page which is valid at that particular time after the selection value, is taken into account by the storage control means 22. In this way, a plurality of configuration algorithms for the FPGA 2 can be stored in a memory area, and the FPGA module 2 is configured by a memory access by the storage control means 22. Depending on the selection value, the storage control means 22 then accesses the data page which is valid at that particular time at the same memory address and configures the FPGA hardware 2 accordingly. In a memory address area in the memory, the data page which is valid at that particular time is superimposed on the other pages which could be used as an alternative for configuring the hardware, but are not required at that particular time owing to the device wiring which is present.

One possible way of reconfiguring the hardware 2 is to change the interfaces 17–19 to the data bus. In this case, the wiring of the individual logic elements of the interface modules 17–19 is changed and is then embodied in the form of FPGA memory cells 2. For example, the interface 19 can be adapted to a new data bus by reconfiguring the hardware. On the other hand, however, an interface 16 can also be adapted to a new device so that the logic cells and the wiring in the interface module 16 are changed. The greater the number of devices in the network, the more reconfiguration processes may be necessary during the lifetime of a vehicle. For this purpose it is possible to have that the devices themselves already provide a suitable algorithm for reconfiguring the hardware, which is then transmitted to the storage control means 22 via the corresponding interface and automatically provides reconfiguration of the interface modules 15 to 19. This automatic reconfiguration of the hardware 2 may be carried out by the storage control module 22 after an authorization check.

The universal computer according to the invention, can be designed to reconfigure its own architecture and to reconfigure the network actuation means. For example, on the basis of the computer architecture, it is possible to change the wiring to the interfaces 15–19 or the wiring between the individual devices. On the other hand, the interfaces can be automatically adapted to devices if they make available an algorithm for reconfiguring and transmitting the computer architecture, and the storage control means 22 automatically provides, on the basis of these algorithms, for the circuits which are embodied in FPGA 2 to be reconfigured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A universal computer for a vehicle, said universal computer comprising:
   a microprocessor for processing control programs;
   a storage unit for data calculated during processing of the control programs;
   an interface for connecting the computer to a vehicle data bus;

control programs for controlling devices provided in the vehicle, wherein control instructions are transmitted via device interfaces to the devices to be controlled;

reconfigurable hardware which permits subsequent reconfiguration of peripheral components or of an interface in an installed state of the computer;

transmission means which transmit an algorithm, for reconfiguring the hardware, to the storage unit whereby a process for reconfiguring the hardware with regard to the peripheral components or to the interface can be carried out;

a storage control unit which automatically transmits the algorithm for reconfiguring the hardware to the storage unit; and a memory in which a plurality of data pages for configuring the hardware are stored, wherein only one of the data pages is classified as valid in a present device configuration and wherein the storage control unit retrieves applicable data pages during a reconfiguration.

2. The computer as claimed in claim 1, wherein the reconfigurable hardware has freely connectable memory cells with reconfigurable electrical connections which can be subsequently newly connected in accordance with the algorithm for reconfiguring the hardware in the installed state of the computer.

3. The computer as claimed in claim 1, wherein the reconfigurable hardware comprises a field programmable gate array.

4. The computer as claimed in claim 1, wherein the storage control unit transmits the algorithm for reconfiguring the hardware to the storage unit without affecting a processor time of the microprocessor.

5. The computer as claimed in claim 1, wherein the storage unit comprises a flash memory which is connected to a wireless interface via which the algorithm for reconfiguring the hardware can be transmitted into the flash memory.

6. The computer as claimed in claim 1, wherein part of the computer is composed of standard cell blocks which are embodied as reconfigurable hardware.

7. The computer as claimed in claim 6, wherein the microprocessor has standard cell blocks which can be wired via the reconfigurable hardware to an interface in a variable fashion.

8. The computer as claimed in claim 1, wherein data pages for the configuration of the hardware that is necessary for a device that is to be coupled externally to the device interfaces is stored in the form of a hardware description language for transmission to the computer in the device.

9. The computer as claimed in claim 8, wherein the device interface transmits the hardware description language for peripherals and interfaces of the computer to at least one of the computer and the storage control unit.

10. The computer as claimed in claim 1, wherein:

a storage control means is provided; and a transmission safety means permits a transmission of an algorithm for reconfiguring the hardware, only after a check to determine whether a utilized method of data transmission is permissible in a present state of the vehicle or of the computer, and/or whether a sender is authorized to transmit a new algorithm for reconfiguring the hardware.

* * * * *